United States Patent [19]

De Hubry

[11] Patent Number: 4,505,554
[45] Date of Patent: Mar. 19, 1985

[54] ILLUMINATION TRANSMISSION SYSTEM FOR FORMAT ADAPTATION IN PROJECTIONS

[76] Inventor: Fredrik F. De Hubry, 311 S. Doheny Dr., Los Angeles, Calif. 90048

[21] Appl. No.: 41,486

[22] Filed: May 22, 1979

[51] Int. Cl.³ .................. G02B 13/22; G02B 21/00
[52] U.S. Cl. .................................. 350/518; 350/415
[58] Field of Search ............ 350/45, 46, 415, 518, 350/563, 573

[56] References Cited

U.S. PATENT DOCUMENTS 2,510,419  6/1950  Ross ................................ 350/45 X
2,959,099  11/1960  Billard et al. ..................... 350/46 X Primary Examiner—John K. Corbin
Assistant Examiner—Scott J. Sugarman
Attorney, Agent, or Firm—Ralf H. Siegemund

[57] ABSTRACT

The illumination of the regular window of a projector is transmitted by two positive acting lens groups of which the first one collects the illumination in the window and provides a near-parallel, slightly diverging beam; the second lens group receives the beam and is situated so that the window and the center of the objective are located in conjugate planes as to that second group alone; the second projector window to be illuminated is situated between the objective and the second lens group. The system is invariant to distance changes between the groups for the purpose of adaptation to different distances between the windows.

4 Claims, 5 Drawing Figures

FROM LAMP + CONDENSOR

ILLUMINATION TRANSMISSION SYSTEM FOR FORMAT ADAPTATION IN PROJECTIONS

BACKGROUND OF THE INVENTION

The present invention relates to an optical, light energy-transmitting device, for transmitting the illumination of a projection field and window to another one.

A device of the type to which the invention pertains is used, for example, as follows. A movie projector is usually provided with a particular window which is fully illuminated and accommodates a particular format for the frames of a film, for example, a 70 mm or a 35 mm film format. One cannot use that projector without modification for running and projecting a film of a different format. Aside from mechanical difficulties such as different requirements for the sprocket transport of the film strip, different reel sizes, etc., the illumination is wrong for a different-size frame format. One needs in particular a different window, cooperating with the different format-type film which, moreover, is also moved by its own transport. Thus, one needs adapter equipment to be placed in front of the regular window of the projector.

The invention now is specifically concerned with the optics needed to transmit or transfer the illumination field in (and from) the original and regular window of the projector, to the window in the adapter equipment. A projector, thus modified, can then readily be used for showing, e.g., a 16-mm movie in a 35-mm projector without direct structural modification of the latter, except that the projection lens is replaced by the adapter. This adapting equipment is simply removed when the projector tube is used for showing a movie of the format for which it was designed.

Optical transmission systems for the described purpose have been used in the past, actually for quite a long time. However, there was little need for such an optical transmission system because format adaptation as described was very rare. It is a fairly recent development that the demand has increased to show, for example, a 16-mm movie (or a super 8) on a "regular" 35-mm movie projector.

The types of transmission systems for that purpose and, as they are known, appear to fall into two groups or categories to be explained briefly below with reference to FIGS. 1 and 2. Both types are characterized by a rather drastic loss in illumination intensity from the center towards the edges of the effective illumination field. Since many commonly used projectors exhibit already such a drop, particularly in the corners of the illumination field, this additional loss and drop-off in illumination deteriorates the illumination quality and distribution further which may well account for the fact that these known devices are used only with considerable reservations. Moreover, the known transmission devices and systems are usable only for a particular distance between primary and secondary windows.

Thus, there is a need to provide an optical illumination field transmitting device which does not produce dark corners in the projection field and is not constrained by fixed window spacings.

DESCRIPTION OF THE INVENTION

It is an object of the present invention to provide a new and improved transmission optic which transmits or transfers the illumination field (and energy) from a projector window to another window under conditions which do not compound a drop in intensity towards the edges.

It is another object of the present invention to provide a new and improved optical transmission device for transmitting illuminating energy from a primary window to a secondary window being spaced from the primary window at a particular distance, but the device should be independent from that distance so as to be usable for different distances, e.g., in different projectors and for different adaptors.

It is actually a feature of the present invention that the transmission system compensates already existing losses and drop in intensity towards the edges so that the resulting (secondary) window illumination is more evenly distributed than the illumination in the primary window.

In accordance with the preferred embodiment of the present invention, it is suggested to provide a transmission optic which is comprised of two lens groups, each acting positively and being respectively disposed particularly in relation to the primary window and to a secondary window, but not necessarily to each other so as to be adaptable to different distances between the windows. The primary window, of course, receives directly an illumination beam from a lamp and condenser mirror as a strongly converging beam. The first group is placed so that its focal point is situated in or near the primary window to produce a near-parallel, slightly diverging beam. The second group is disposed fairly close to the secondary window and in a position so that, in the absence of the first group, the primary window and the principal or central (or nodal) plane of the objective behind the secondary window are situated in conjugate planes. The objective and the secondary window pertain to the adaptor which includes means for moving the film across the secondary window.

The position of the first group of lenses is essentially independent from the location of the secondary window and from the placement of the second group; the position of the latter permits a wide range of adjustment to accomplish the existing distance of the objective (having a particular distance from the secondary window) from the primary window. Also, the position of the second group, as regards the defined conjugate planes, is not critical because imagery is not involved.

The first group of lenses serves as entrance pupil for the second group (rather than the primary window) so that the characteristics of the illumination field distribution of the primary window is not transmitted upon the secondary window. The principal points of the several lenses can be chosen so that one obtains a complete and uniform illumination of the secondary window, thereby compensating to a considerable extent any illumination intensity drop-off towards the edges and corners of and in the primary window.

As a further benefit, the diameter of the complete lens system is reduced to a much smaller size in comparison to the projected convergent beam of the projection lamp.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a first projection system which has been used quite a long time ago. A projector window 1 is disposed in the path of light from a conventional illuminating source which includes a lamp and a condensor mirror to produce a beam 3 having strongly converging components. It should be noted that it is common practice to block direct radiation from the lamp into the optical axis of the projection system. A film strip 4' runs normally directly behind window 1 as seen in the direction of light propagation, except that presently the particular projector is to be adapted to a different format.

Figure 1:
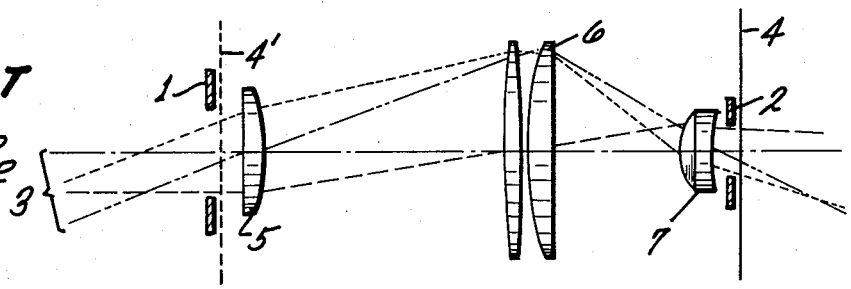
FIGS. 1 and 2 illustrate two different optical transmission systems in accordance with the prior art.

The known optical transmission systems include, for example, a collector element 5 behind window 1, a large collecting unit 6, and a negative element 7 in front of the second window 2 across which runs the film 4 of a different format. The assembly is, basically, of the field lens condensor type, requiring a large maximum diameter of the tube for mounting the lenses and interposing the system between the regular window 1 of the projector and window 2 of the adaptor. Due to the large diameter, the system produces a considerable drop-off of the beam's intensity towards the corners and edges of window 2. The illumination of a frame of film 4 is thus quite uneven.

The other known variety (FIG. 2) consists of two coupled objectives 8 and 9 or the like and may or may not have a centrally disposed field lens. Otherwise, this system is likewise disadvantaged by poor illumination of the corners of the projection window 2. Moreover, both types of systems require critical adjustment of all of the optical elements, and they are actually designed for a particular distance between windows 1a and 2a.

Figure 3A:
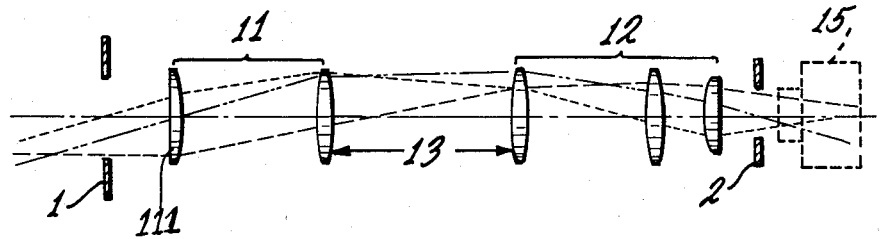
FIGS. 3a and 3b illustrate a preferred embodiment of the present invention adjusted for different operating conditions.
Figure 3B:
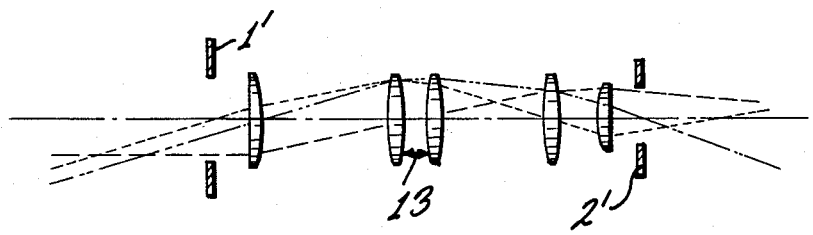

The transmission system in accordance with the preferred embodiment (FIGS. 3a, 3b, and 4) is comprised of two lens groups 11 and 12. The lenses of the two groups are of relatively small diameter and are quite simple in design. One may supplement them with lenses for correcting color distortion. Other corrections are not needed because the system as a whole is not used as an imaging system, but for collecting the illumination energy in window 1 and transmitting it to window 2.

The two groups can be spaced by a distance which is not critical; rather that spacing 13 can be varied over a wide range. In other words, the system is not tied to a particular distance between windows 1 and 2, this distance may differ as demonstrated in FIGS. 3a and 3b, the latter showing a different window 2' pertaining, e.g., to a different type of adaptor for a different film frame format.

Group 11 is designed and positioned in that window 1 serves as its entrance pupil. It is positioned to convert the illumination beam as rather highly converging toward the window and diverging therefrom, into a beam of nearly parallel rays, with but a slight divergence. The front-end element III of the first group should bear a reflective layer, particularly for reflecting infrared radiation to prevent the system from overheating.

The second group 12 is designed and positioned so that, taken by itself, it would project (image) window 1, and here particularly the center of that window into objective 15 of the projection system, particularly into one of the principal points of the objective. Thus, the principal plane of the objective lens and the plane of window 1 are conjugate planes as far as group 12 is concerned. However, this rule is only given here for defining the position of the second lens group, 12. Group 12 does not image the window into the objective 15, neither group is used as an imaging system. Rather, the first group 11 serves as entrance pupil for group 12. This way, one does not transmit the characteristics of window 1 into window 2 as far as the illumination intensity distribution in the window is concerned (which is quite uneven!). The principal points of the several lenses are so chosen that the zone illumination of the field in window 1 is inverted, which will be explained next.

The dashed line represents a typical beam, having a moderately steep angle and passing centrally through window 1. Upon tracing that beam through the system, one will find that it passes through window 2 fairly close to an edge thereof. Analogously, the dash-double-dot line represents a beam, being likewise moderately steeply inclined to the optical axis, but passing fairly close to the edge of window 1. Upon tracing the beam through the system, one can see that it passes centrally through window 2. This inverting phenomenon is the more pronounced, the steeper the angle. An edge-near but axis-parallel beam passes also near the edge of window 2. It can, thus, be seen that the system actually corrects illumination drop-off as it occurs towards the edges in window 1, and the illumination field in window 2 is quite uniform. Moreover, if the distance 13 between the two lens groups changes (FIG. 3a vs. 3b), the beam relation changes locally, but the zone and field inversion as just described is maintained. Moreover, the position of primary group 11 is optically not critical; the divergence of its output beam can be changed within limits, but that change is significantly effective so that the illumination field inversion as produced by the system, remains invariant to changes in the distance 13.

Figure 2:
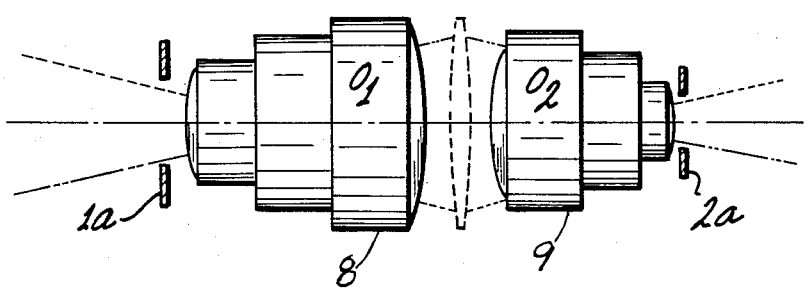

It will be appreciated that such an inversion is not produced in the prior art systems as shown in FIGS. 1 and 2 and as specifically detailed in FIG. 1. The edge near (window 1) steep-angle beam (dashed line) remains near the edges in window 2 so that, indeed, intensity drop-off in the corners is compounded in these systems, whereas the system as per the present invention not only fails to add additional drop-off and corner darkening, but compensates and corrects such darkening of the entrance field in window 1.

Figure 4:
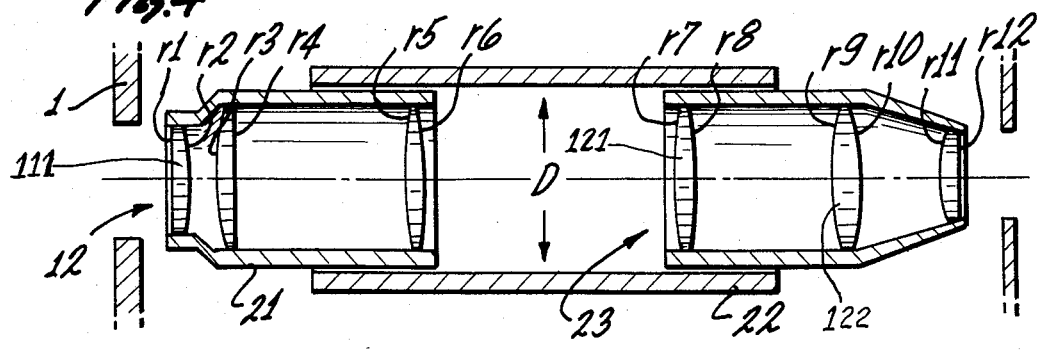
FIG. 4 is a more detailed section view of the optical system shown in FIGS. 3a and 3b and identifying the several elements and parameters as set forth in a table below.

As shown in FIG. 4, group 11 is contained in a tube 21 being telescoped in adjusting tube 23 which, in turn, receives tube 22 for group 12. This way, one can adjust the spacing 13 over a fairly large range. However, it may not be necessary to render the tube systems 21, 22, and 23 adjustable in axial direction. It may be more economical to use, for example, differently long center tubes 23 and to manufacture various systems, differing just in the spacing of the two lens groups, to accommodate different distances between windows 1 and 2; for a given system, no further change is needed. Of course, this is an optional constraint. One may readily provide for a screw thread type adjustment of the tubes, so as to telescope the tubes 21 and 22 farther or less far into spacer tube 23. Adjustment of tube 21 (group 1) changes the divergence of its output beam; adjustment of tube 22 matches the conjugate planes to the distance between the windows in the respective instance.

A particular system has been designed for use with a 35-mm projector in order to project a 16-mm film by means of the adaptor which includes window 2. The projector itself is operated with the usual Xenon arc lamp at a 800-mm focal length of the conductor mirror and at a 14° exit angle. The spacing 13 between the two groups can be adjusted between 44 mm and 104 mm, for adjusting the length of the system to different window distances in the range from 240 mm to 380 mm. The range, 44/104 mm, is about twice the effective diameter of the lenses in the tubes. The table below shows further details for this particular transmission device and system.

TABLE

| | | Index of Refraction | Abbe Number |
|---|---|---|---|
| $r1 = \infty$ | $d1 = 7,2$ | $nd1 = 1,470$ | $vd1 = 66,5$ |
| $r2 = 103$ | | | |
| | | $a1 = 8,5$ | |
| $r3 = 121.18$ | $d2 = 7,8$ | $nd2 = 1,520$ | $vd2 = 60$ |
| $r4 = \infty$ | | | |
| | | $a2 = 78$ | |
| $r5 = 207,22$ | $d3 = 8,0$ | $nd3 = 1,518$ | $vd3 = 60,5$ |
| $r6 = 207,22$ | | | |
| | Spacing 13 = 104 max./44 min. | | |
| $r7 = 202,148$ | $d4 = 8,2$ | $nd4 = 1,526$ | $vd4 = 58,8$ |
| $r8 = 202,148$ | | | |
| | | $a3 = 51$ | |
| $r9 = 135,68$ | $d5 = 9,2$ | $nd5 = 1,523$ | $vd5 = 60,2$ |
| $r10 = 135,68$ | | | |
| | | $a4 = 29,2$ | |
| $r11 = 38,78$ | $d6 = 8,2$ | $nd6 = 1,464$ | $vd6 = 66$ |
| $r12 = \infty$ | | | |

It was found, surprisingly, that very little modification is needed to provide a system that converts, e.g., a 35-mm format to super 8, being about a 3:1 conversion ratio as far as the windows are concerned. The lenses 121 and 122 of group 12 (see Table) have respectively focal lengths of 120 mm and 76 mm. By reducing the focal length of lens 121 to 100 mm and the focal length of lens 122 to 63 mm, one obtains a higher power at that end of the second group, sufficient to contract the beam into the smaller-size window for a super 8 format. Correspondingly, the power of only these two elements of group 12 needs to be reduced, for a smaller ratio or even a 1:1 transmission ratio. Such a system is of interest per se due to the improvement in field illumination provided by this system. As a general rule, it was found that the ratio of the total focal lengths of each of the two groups merely needs to change in proportion to the ratio of the linear window dimensions.

The invention is not limited to the embodiments described above, but all changes and modifications thereof not constituting departures from the spirit and scope of the invention are intended to be included.

What is claimed is:

1. Optical device for transmitting the illumination energy in a first window of a projector to a second window spaced from the first window in direction of a projector axis, the illumination energy being provided by a projector lamp and condenser mirror to the first window, a projector objective is to be placed behind the second window, the objective having a principal point, comprising:

a first group of positive acting lenses positioned in relation to and behind the first window so that a focal point of the first group is near the first window and a projecting beam as provided by the projection lamp and converging towards the first window is converted by the first group into a beam of near-parallel rays; and a second group of positive-acting lenses being disposed in between and in relation to the first and second windows to focus, in the absence of the first group, a central point of the first window through the second window and into a point in which to place the principal point of the projection objective behind the second window.

2. In a projector system having a projector lamp and a condensor mirror for providing illumination energy to a first window along a projector axis, the combination comprising:

a first group of positive acting lenses positioned in relation to and behind the first window so that a focal point of the first group is near the first window and a projecting beam as provided by the projection lamp and converging towards the first window is converted by the first group into a beam of near-parallel rays;

a second window spaced from the first window in direction of the projector axis;

a second group of positive acting lenses being disposed in between and in relation to the first and second windows to focus, in the absence of the first group, a central point of the first window through the second window and into a point; and a projection objective having a principal point and being placed behind the second window so that said principal point coincides with the said point in which said central point would be focused in the absence of the first group.

3. Device as in claim 1 or 2, wherein the distance between the first and second groups is varible.

4. Device as in claim 1 or 2, each of the groups having a particular focal length, the ratio of the two lengths being approximately equal to the ratio of the apertures of the windows.

* * * * *